United States Patent
Selvaganapathy et al.

(10) Patent No.: US 11,973,587 B2
(45) Date of Patent: Apr. 30, 2024

(54) TIME SLOT CONTROL FOR RADIO POWER BOOSTING

(71) Applicant: NOKIA TECHNOLOGIES OY, Espoo (FI)

(72) Inventors: Srinivasan Selvaganapathy, Bangalore (IN); Karri Markus Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 487 days.

(21) Appl. No.: 17/309,653

(22) PCT Filed: Mar. 17, 2020

(86) PCT No.: PCT/EP2020/057208
§ 371 (c)(1),
(2) Date: Jun. 11, 2021

(87) PCT Pub. No.: WO2020/200752
PCT Pub. Date: Oct. 8, 2020

(65) Prior Publication Data
US 2022/0038203 A1 Feb. 3, 2022

(30) Foreign Application Priority Data
Mar. 29, 2019 (IN) .............................. 201941012626

(51) Int. Cl.
*H04L 1/00* (2006.01)
*H04L 1/1607* (2023.01)
(Continued)

(52) U.S. Cl.
CPC .......... *H04L 1/0004* (2013.01); *H04L 1/1614* (2013.01); *H04W 72/0446* (2013.01); *H04W 72/21* (2023.01)

(58) Field of Classification Search
None
See application file for complete search history.

(56) References Cited

U.S. PATENT DOCUMENTS

| 2010/0323733 A1 | 12/2010 | Klein et al. |
| 2014/0112260 A1 | 4/2014 | Sorrentino |

(Continued)

FOREIGN PATENT DOCUMENTS

EP 3429149 A1 1/2019

OTHER PUBLICATIONS

International Search Report and Written Opinion for International Application No. PCT/EP2020/057208, dated May 28, 2020, 16 pages.

(Continued)

*Primary Examiner* — Saad Khawar
(74) *Attorney, Agent, or Firm* — Robert P. Michal, Esq.; Carter, DeLuca & Farrell LLP (57) ABSTRACT

There are provided measures for time slot control for radio power boosting. Such measures exemplarily comprise transmitting, to a terminal, a configuration indicative of uplink slots to be used by said terminal when a first modulation and coding scheme is activated, and controlling a transmission, to said terminal, of information indicative of that said first modulation and coding scheme is to be activated.

8 Claims, 8 Drawing Sheets

(51) Int. Cl.
*H04W 72/0446* (2023.01)
*H04W 72/21* (2023.01)

(56) References Cited

U.S. PATENT DOCUMENTS

| | | |
|---|---|---|
| 2018/0103434 A1 | 4/2018 | Zhou et al. |
| 2019/0342137 A1* | 11/2019 | Zhang ................ H04L 27/262 |
| 2019/0373486 A1* | 12/2019 | Bai .................... H04L 1/0009 |
| 2019/0394785 A1* | 12/2019 | He .................... H04L 1/0023 |

OTHER PUBLICATIONS

Office Action for European Application No. 20712300.1, dated Sep. 27, 2023, 3 pages.

* cited by examiner

TIME SLOT CONTROL FOR RADIO POWER BOOSTING

CROSS-REFERENCE TO RELATED APPLICATIONS

This application is a national stage entry of International Application No. PCT/EP2020/057208, filed Mar. 17, 2020, entitled "TIME SLOT CONTROL FOR RADIO POWER BOOSTING" which claims the benefit of priority of Indian Patent Application No. 201941012626, filed Mar. 29, 2019, both of which are hereby incorporated by reference in their entireties.

FIELD

The present invention relates to time slot control for radio power boosting. More specifically, the present invention exemplarily relates to measures (including methods, apparatuses and computer program products) for realizing time slot control for radio power boosting.

BACKGROUND

The present specification generally relates to coverage enhancements in cell based radio communication scenarios. More specifically, the present specification relates to 3rd Generation Partnership Project (3GPP) New Radio (NR) scenarios and in particular to uplink coverage enhancements in frequency division duplexing (FDD) cases in such scenarios.

For improved peak-to-average power ratio (PAPR) performance in uplink to enable maximum uplink power utilization, NR specifications introduce the following features.

On the one hand, Discrete Fourier Transform (DFT)-spread orthogonal frequency division multiplexing (OFDM) for improved PAPR performance is provided.

Further, power boosting of uplink transmission power is provided. Here, boosting the uplink transmission power by additional 3 dB over the maximum power corresponds to the default power class (PC2) along with additional spectrum shaping to compensate the impacts of non-linearity introduced by power-boosting. Use of power boosting by additional 3 dB is applicable for time division duplexing (TDD) systems with an uplink duty cycle less than 40%. This limit is set to ensure that the overall average uplink transmission power remains within the specific absorption rate (SAR) limit specified for the power class.

Finally, the use of a pi/2 BPSK modulation scheme (BPSK: binary phase shift keying) is envisaged. While the pi/2 BPSK (also n/2 BPSK) modulation scheme provides, among others, the advantage of an easier achievable bit synchronism at the receiver, it has the lowest PAPR across all the supported modulation and coding schemes (MCS).

Thus, for benefiting from the advantages of the pi/2 BPSK modulation scheme and at the same time increasing PAPR performance in uplink to enable maximum uplink power utilization, it might be considered to It is possible to use the pi/2-BPSK with power boosting as another modulation scheme which might be used to improve the cell coverage for FDD system also.

This, however, would require the scheduler to ensure that the uplink slot allocation with this scheme remains within 40% at least during the times of full power transmissions. When the scheduler assigns this option towards UE in dynamic way, it would be difficult for the scheduler to ensure this duty-cycle.

Hence, the problem arises that relevant in the above-illustrated scenario in any case the SAR limits must not be violated.

Hence, there is a need to provide for time slot control for radio power boosting.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising transmitting, to a terminal, a configuration indicative of uplink slots to be used by said terminal when a first modulation and coding scheme is activated, and controlling a transmission, to said terminal, of information indicative of that said first modulation and coding scheme is to be activated.

According to an exemplary aspect of the present invention, there is provided a method comprising obtaining a configuration indicative of uplink slots to be used when a first modulation and coding scheme is activated, receiving information indicative of that said first modulation and coding scheme is to be activated, and activating, upon receiving said information, said first modulation and coding scheme for uplink transmission.

According to an exemplary aspect of the present invention, there is provided an apparatus comprising transmitting circuitry configured to transmit, to a terminal, a configuration indicative of uplink slots to be used by said terminal when a first modulation and coding scheme is activated, and control circuitry configured to control a transmission, to said terminal, of information indicative of that said first modulation and coding scheme is to be activated.

According to an exemplary aspect of the present invention, there is provided an apparatus comprising obtaining circuitry configured to obtain a configuration indicative of uplink slots to be used when a first modulation and coding scheme is activated, receiving circuitry configured to receive information indicative of that said first modulation and coding scheme is to be activated, and activating circuitry configured to activate, upon receiving said information, said first modulation and coding scheme for uplink transmission.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform transmitting, to a terminal, a configuration indicative of uplink slots to be used by said terminal when a first modulation and coding scheme is activated, and controlling a transmission, to said terminal, of information indicative of that said first modulation and coding scheme is to be activated.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform obtaining a configuration indicative of uplink slots to be used when a first modulation and coding scheme is activated, receiving information indicative of that said first modulation and coding scheme is to be activated, and activating, upon receiving said information, said first modulation and coding scheme for uplink transmission.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient improvement of PAPR performance in uplink for achieving coverage enhancements while ensuring compliance with specified SAR limits, to thereby solve at least part of the problems and drawbacks identified in relation to the prior art.

By way of exemplary embodiments of the present invention, there is provided time slot control for radio power boosting. More specifically, by way of exemplary embodiments of the present invention, there are provided measures and mechanisms for realizing time slot control for radio power boosting.

Thus, improvement is achieved by methods, apparatuses and computer program products enabling/realizing time slot control for radio power boosting.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP (in particular NR related) specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) time slot control for radio power boosting.

Generally, exemplary embodiments of the present invention propose extension of the power boosting operation for FDD operation with flexible uplink resource configuration to enable maximum resource utilization across different user equipments (UE). Such configuration guarantee may be considered as a necessity for the UEs to be able to use power boosting and provide assurances that they do not violate the SAR limits under any conditions rather than leaving it up to the gNB scheduler to ensure that the UE complies with the SAR limits.

Namely, present LTE TDD systems uses different uplink/downlink (UL/DL) configurations assigned per cell. This configuration allows different ration for uplink and downlink but needs to be maintained as common configuration across the cell.

Present NR TDD configurations also have the flexibility of assigning different number of symbols for uplink and downlink, however, these configurations are meant for resource split across uplink and downlink.

LTE-NR dual connectivity with UEs that are not capable of simultaneously transmitting LTE and NR uplinks can be configured with an LTE TDD reference pattern for the LTE FDD uplink. This reference pattern ensures that the LTE uplink is transmitted on known time intervals only, and the NR scheduler is then expected to ensure that the NR uplink is scheduled only on those time instances where the LTE uplink is not transmitting.

However, the present NR system does not have a mechanism to provide the same, nor would the LTE TDD reference pattern apply, as there is no similar fixed TDD patterns to rely on in the NR.

In this mechanism the uplink pattern at LTE is to enable the time division multiplexing (TDM) operation between LTE and NR. This information is used for NR scheduler not to use these instances.

Masking of uplink transmission in specific subframes for FDD to ensure the uplink resource usage limited within specific duty-cycle when power boosting is enabled is not known. Use of power boosting along with UE specific uplink mask as another robust MCS scheme for FDD to achieve extended coverage is not known.

In addition to the above, exemplary embodiments of the present invention propose an additional RRC configuration to ensure that uplink utilization is restricted within the limit without impacting the overall resource utilization.

Figure 1:
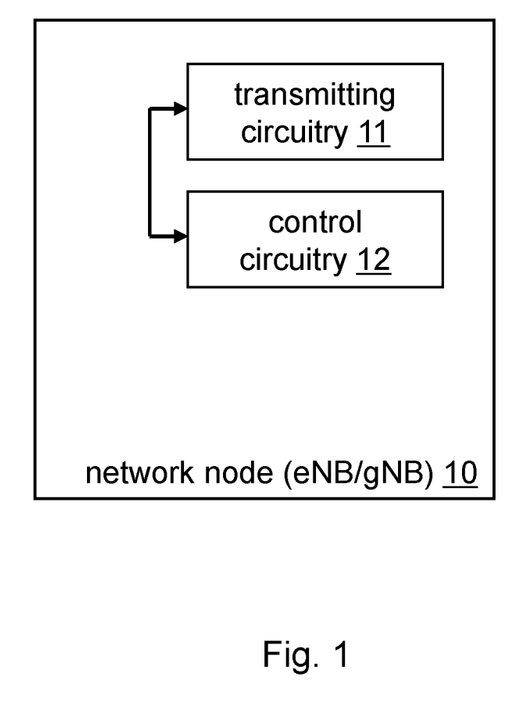
FIG. 1 is a block diagram illustrating an apparatus according to exemplary embodiments of the present invention.
Figure 5:
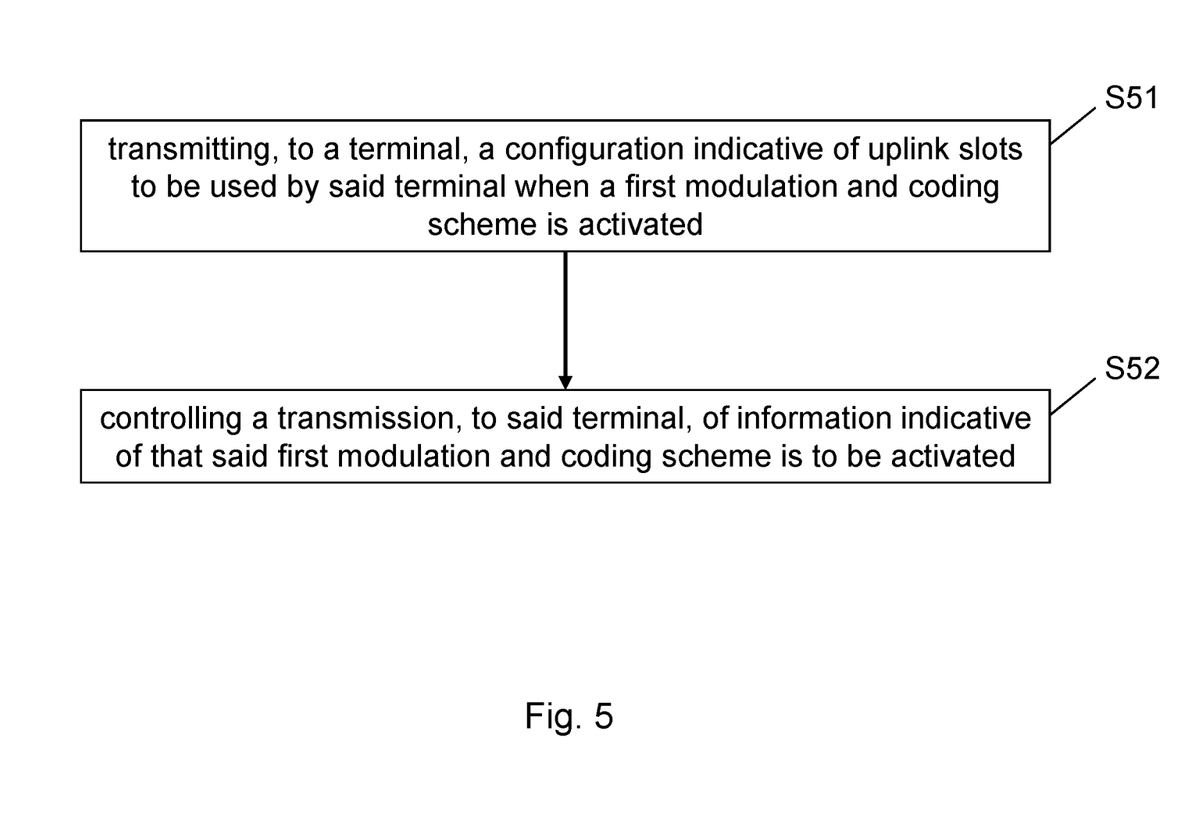
FIG. 5 is a schematic diagram of a procedure according to exemplary embodiments of the present invention.

FIG. 1 is a block diagram illustrating an apparatus according to exemplary embodiments of the present invention. The apparatus may be a network node (e.g. access node) 10 such as a base station (e.g. eNB, gNB) comprising a transmitting circuitry 11 and a control circuitry 12. The transmitting circuitry 11 transmits, to a terminal (e.g. terminal 20), a configuration indicative of uplink slots to be used by said terminal when a first modulation and coding scheme is activated. The control circuitry 12 controls a transmission, to said terminal, of information indicative of that said first modulation and coding scheme is to be activated. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of transmitting (S51), to a terminal, a configuration indicative of uplink slots to be used by said terminal when a first modulation and coding scheme is activated, and an operation of controlling (S52) a transmission, to said terminal, of information indicative of that said first modulation and coding scheme is to be activated.

Figure 2:
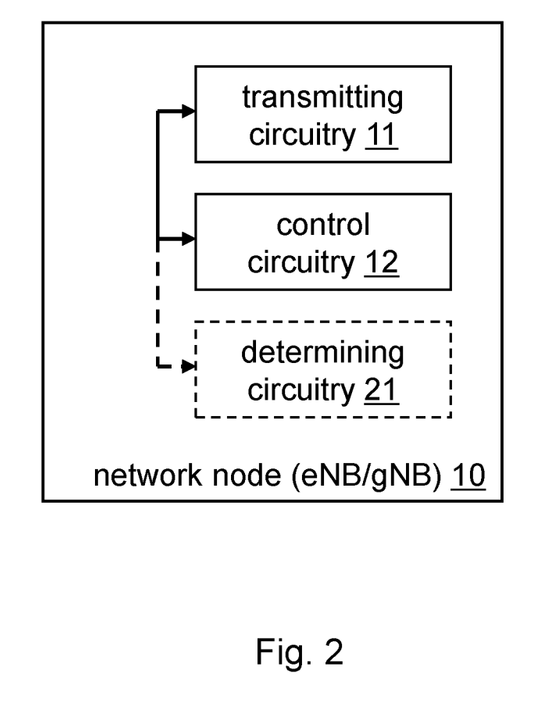
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a determining circuitry 21.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes. Such shared architecture, may comprise a remote control unit (RCU), such as a host computer or a server computer, operatively coupled (e.g. via a wireless or wired network) to a remote radio head (RRH) located in the base station or eNB/gNB, for example. In an embodiment, at least some of the described processes may be performed by the RCU. In an embodiment, the execution of at least some of the described processes may be shared among the RRH and the RCU. In practice, any digital signal processing task may be performed in either the RRH or the RCU and the boundary where the responsibility is shifted between the RRH and the RCU may be selected according to implementation.

According to a variation of the procedure shown in FIG. 5, exemplary details of the transmitting operation (S51) are given, which are inherently independent from each other as such.

Such exemplary transmitting operation (S51) according to exemplary embodiments of the present invention may comprise a radio resource control signaling.

Alternatively, such exemplary transmitting operation (S51) according to exemplary embodiments of the present invention may comprise a radio resource control re-configuration signaling.

According to a variation of the procedure shown in FIG. 5, exemplary additional operations and exemplary details of the controlling operation (S52) are given, which are inherently independent from each other as such.

According to such variation, an exemplary method according to exemplary embodiments of the present invention may comprise an operation of determining whether a first condition related to a radio cell providing uplink resources for said terminal is fulfilled. Further, such exemplary controlling operation (S52) according to exemplary embodiments of the present invention may comprise an operation of deciding to control said transmission, if said first condition is fulfilled.

According to further exemplary embodiments of the present invention, said first condition includes that an uplink coverage condition of said radio cell is smaller than a predetermined modulation and coding scheme threshold related to a second modulation and coding scheme.

According to further exemplary embodiments of the present invention, said second modulation and coding scheme corresponds to pi/2-binary-phase-shift-keying without power-boosting.

According to further exemplary embodiments of the present invention, said first modulation and coding scheme corresponds to pi/2-binary-phase-shift-keying with power-boosting.

According to further exemplary embodiments of the present invention, said power-boosting indicates an increase of transmission power by a predetermined amount. In an example, this predetermined amount may be 3 dB. In another example, a configuration of the maximum value for power boosting is enabled. This allows the eNB/gNB to configure more uplink slots if required with lesser power boosting.

According to further exemplary embodiments of the present invention, said information includes downlink control information.

According to further exemplary embodiments of the present invention, said configuration indicates said uplink slots as a bitmap over a predetermined number of slots.

According to further exemplary embodiments of the present invention, said configuration indicates permitted symbols for each of said uplink slots.

According to further exemplary embodiments of the present invention, said configuration indicates a periodicity of a pattern formed by said bitmap over said predetermined number of slots.

Figure 3:
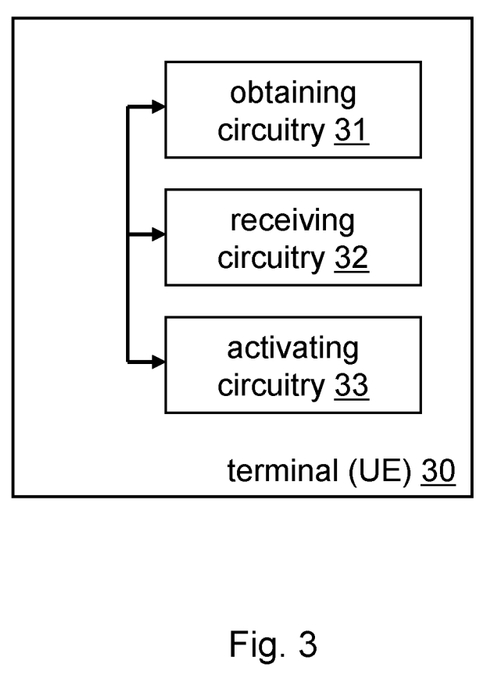
FIG. 3 is a block diagram illustrating an apparatus according to exemplary embodiments of the present invention.
Figure 6:
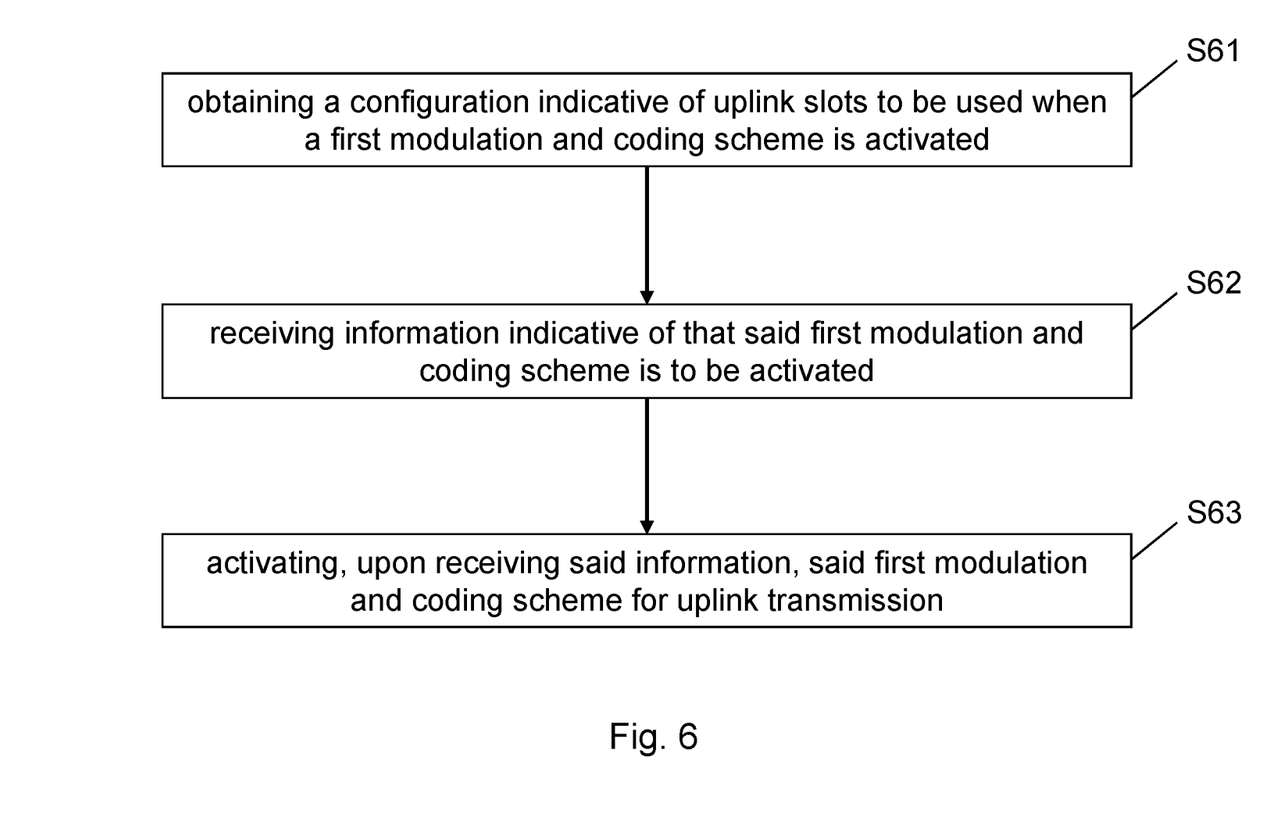
FIG. 6 is a schematic diagram of a procedure according to exemplary embodiments of the present invention.

FIG. 3 is a block diagram illustrating an apparatus according to exemplary embodiments of the present invention. The apparatus may be a terminal 30 such as a user equipment (UE) comprising an obtaining circuitry 31, a receiving circuitry 32, and an activating circuitry 33. The obtaining circuitry 31 obtains a configuration indicative of uplink slots to be used when a first modulation and coding scheme is activated. The receiving circuitry 32 receives information indicative of that said first modulation and coding scheme is to be activated. The activating circuitry 33 activates, upon receiving said information, said first modulation and coding scheme for uplink transmission. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of obtaining (S61) a configuration indicative of uplink slots to be used when a first modulation and coding scheme is activated, an operation of receiving (S62) information indicative of that said first modulation and coding scheme is to be activated, and an operation of activating (S63), upon receiving said information, said first modulation and coding scheme for uplink transmission.

Figure 4:
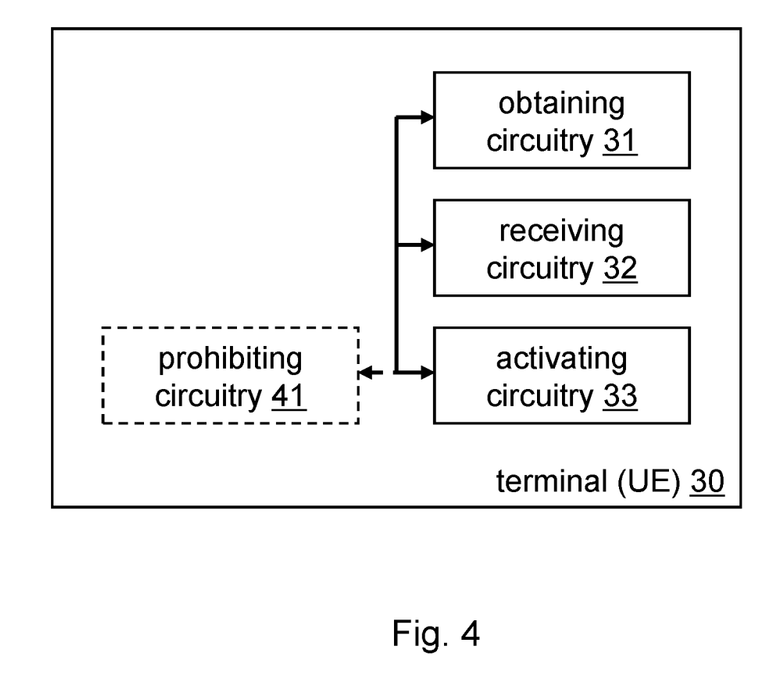
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a prohibiting circuitry 41.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 6, exemplary details of the obtaining operation (S61) are given, which are inherently independent from each other as such.

Such exemplary obtaining operation (S61) according to exemplary embodiments of the present invention may comprise an operation of receiving a radio resource control signaling.

Alternatively, such exemplary obtaining operation (S61) according to exemplary embodiments of the present invention may comprise an operation of receiving a radio resource control re-configuration signaling.

According to further exemplary embodiments of the present invention, said first modulation and coding scheme corresponds to pi/2-binary-phase-shift-keying with power-boosting.

According to further exemplary embodiments of the present invention, said power-boosting indicates an increase of transmission power by a predetermined amount. In an example, this predetermined amount may be 3 dB.

According to further exemplary embodiments of the present invention, said information includes downlink control information.

According to further exemplary embodiments of the present invention, said configuration indicates said uplink slots as a bitmap over a predetermined number of slots.

According to further exemplary embodiments of the present invention, said configuration indicates permitted symbols for each of said uplink slots.

According to further exemplary embodiments of the present invention, said configuration indicates a periodicity of a pattern formed by said bitmap over said predetermined number of slots.

According to a variation of the procedure shown in FIG. 6, exemplary additional operations are given, which are inherently independent from each other as such. According to such variation, an exemplary method according to exemplary embodiments of the present invention may comprise an operation of receiving scheduling information scheduling an uplink transmission to a slot or slot symbol not comprised by said uplink slots to be used when said first modulation and coding scheme is activated indicated by said configuration, and an operation of prohibiting, if said first modulation and coding scheme for uplink transmission is activated, said uplink transmission on said slot or slot symbol not comprised by said uplink slots to be used when said first modulation and coding scheme is activated indicated by said configuration.

In other words, according to exemplary embodiments of the present invention (in relation to an NR FDD system), the following abilities and related control communication changes are implemented in order to allow for application of pi/2-BPSK with power boosting operation to extend the cell coverage of a UE beyond the current limits without exceeding specified limits (e.g. SAR).

In detail, according to exemplary embodiments of the present invention, the gNB configures the pi/2-BPSK with power-boosting as additional MCS to be used when the uplink coverage condition estimated at gNB goes below the MCS threshold for pi/2-BPSK usage without power boosting.

Further, according to exemplary embodiments of the present invention, the MCS information in downlink control information (DCI) also has additional code-point to activate pi/2-BPSK with power boosting. As an example, one or more of the reserved code points in the MCS index table for physical uplink shared channel (PUSCH) are used for this purpose.

Further, according to exemplary embodiments of the present invention, the gNB also configures via dedicated radio resource control (RRC) signaling towards the UE (e.g. terminal 30) a slot-configuration to be used when the MCS associated with pi/2-BPSK+Power-boosting is activated. The gNB may reconfigure the slot-configuration to different values via RRC Reconfiguration.

According to exemplary embodiments of the present invention, the slot configuration defines the uplink slots to be used for transmission as bitmap over N number of slots. This configuration can also be defined as symbol level configuration (permitted symbols) within slot. For example, half-slot transmission in all the slots could be one valid configuration.

According to further exemplary embodiments of the present invention, when the UE is configured for slot configuration and the MCS for pi/2-BPSK is activated, the uplink transmission is only applicable on the slot which is valid as per the slot configuration only.

According to further exemplary embodiments of the present invention alternatively or additionally to the above-mentioned, the new MCS code points are used for the gNB to schedule the UE to transmit with power boosting, and the slot configuration restriction only applies when the PUSCH is scheduled with these boosting MCSs. With other MCSs the UE behavior would be unchanged, and the uplink transmissions would ignore the slot configuration.

According to further exemplary embodiments of the present invention, this slot configuration is defined for each bandwidth part (BWP) separately to allow flexibility of this configuration for different BWP operations.

Figure 7:
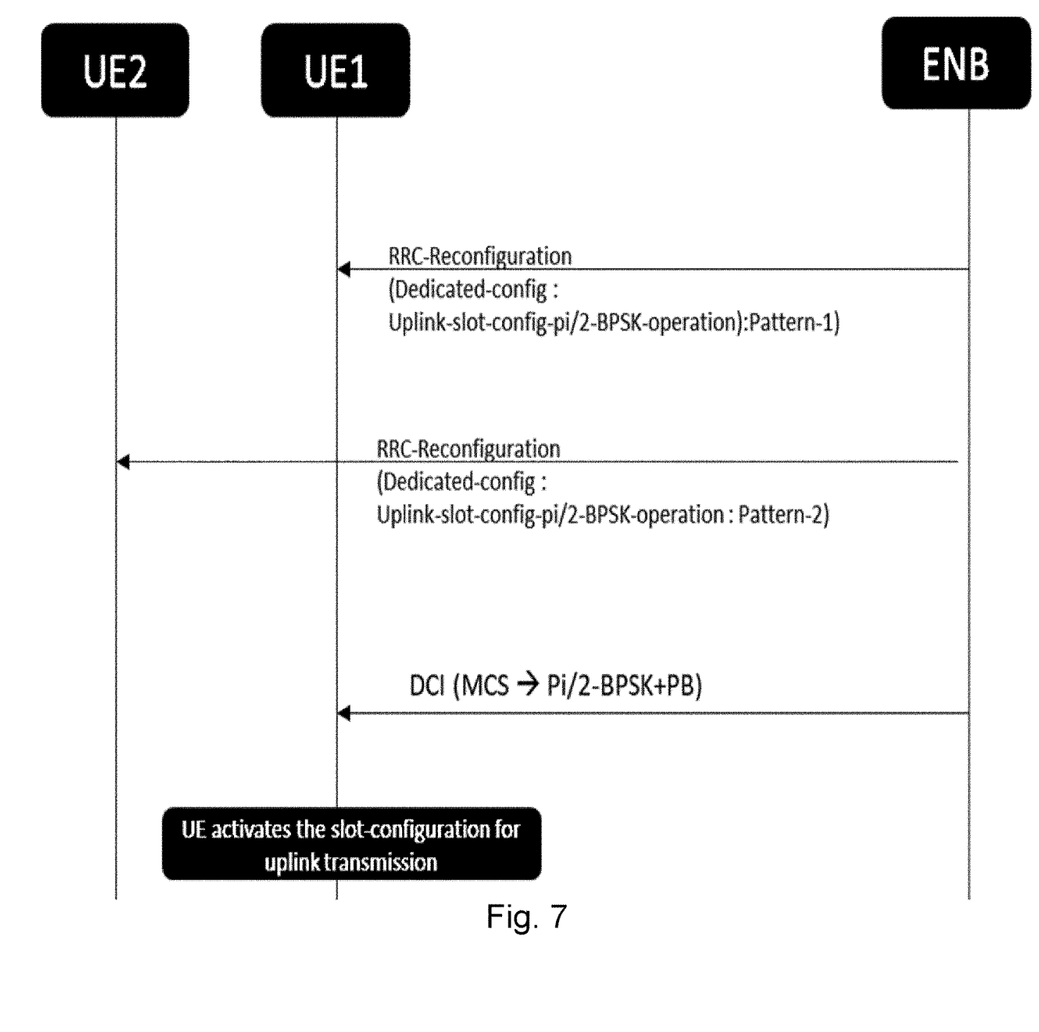
FIG. 7 shows a schematic diagram of an example of a system environment with signaling variants according to exemplary embodiments of the present invention.

FIG. 7 shows a schematic diagram of an example of a system environment with signaling variants according to exemplary embodiments of the present invention and based thereon, exemplary embodiments of the present invention are described with more specific terms.

In particular, FIG. 7 illustrates a message sequence associated with activation of the slot-configuration to be applied as part of RRC configuration and also the inclusion of additional information in DCI to activate the power boosting along with slot-configuration usage for uplink transmission.

Here, it is noted that while uplink slot configurations are provided to two terminals (UE1, UE2), only for one of the two terminals the pi/2-BPSK with power boosting is activated.

It is noted that the scenario shown in FIG. 7 is for illustrative purposes and does not limit the invention. In particular, the eNB/gNB may provide more than two terminals with respective uplink slot configurations and alternatively only one terminal.

Accordingly, the eNB/gNB may activate the pi/2-BPSK with power boosting for more than one terminal (e.g. for both UE1, UE2).

The RRC configuration for UE1 of FIG. 7 includes a first pattern ("Pattern-1") of uplink slots, while the RRC configuration for UE2 of FIG. 7 includes a second pattern ("Pattern-2") of uplink slots.

According to exemplary embodiments of the present invention, pattern-1 and Pattern-2 are configured to be mutually exclusive across different UEs to improve the cell-spectral efficiency when power boosting requires only half of the uplink resource usage.

It is noted that in case that when uplink slot configurations are provided to more than two terminals, according to exemplary embodiments of the present invention, the respective assigned patterns can distribute the transmission opportunities evenly over time, while full mutual exclusivity may not be preferable but at least optionally possible.

In order to allow such control communication as illustrated above, according to exemplary embodiments of the present invention, an existing (in existing rel-15 specification) RRC configuration on serving cell configuration and uplink configuration containing power-boost information is modified by additional information element for power-boost pi/2-BPSK which includes the slot configuration (in Dedicated-Confguration) as shown below.

```
----------------------------------------
ServingCellConfig ::= SEQUENCE {
    tdd-UL-DL-ConfigurationDedicated    TDD-UL-DL-ConfigDedicated
                                        OPTIONAL, -- Cond TDD
    initialDownlinkBWP                  BWP-DownlinkDedicated
                                        OPTIONAL, -- Need M
    downlinkBWP-ToReleaseList           SEQUENCE (SIZE (1..maxNrofBWPs))
                                        OF BWP-Id
                                        OPTIONAL, -- Need N
    downlinkBWP-ToAddModList            SEQUENCE (SIZE (1..maxNrofBWPs))
                                        OF BWP-Downlink
                                        OPTIONAL, -- Need N
    firstActiveDownlinkBWP-Id           BWP-Id
                                        OPTIONAL, -- Cond SyncAndCellAdd
    bwp-InactivityTimer                 ENUMERATED {ms2, ms3, ms4, ms5,
                                        ms6, ms8, ms10, ms20, ms30, ms40,
                                        ms50, ms60, ms80, ms100, ms200,
                                        ms300, ms500, ms750, ms1280,
                                        ms1920, ms2560, spare10, spare9,
                                        spare8, spare7, spare6, spare5,
                                        spare4, spare3, spare2, spare1}
                                        OPTIONAL, --Need R
    defaultDownlinkBWP-Id               BWP-Id
                                        OPTIONAL, -- Need S
    uplinkConfig                        UplinkConfig
                                        OPTIONAL, -- Need M
    supplementaryUplink                 UplinkConfig
                                        OPTIONAL, -- Need M
    pdcch-ServingCellConfig             SetupRelease { PDCCH-
                                        ServingCellConfig }
                                        OPTIONAL, -- Need M
    pdsch-ServingCellConfig             SetupRelease { PDSCH-
                                        ServingCellConfig }
                                        OPTIONAL, -- Need M
    csi-MeasConfig                      SetupRelease { CSI-MeasConfig }
                                        OPTIONAL, -- Need M
    sCellDeactivationTimer              ENUMERATED {ms20, ms40, ms80,
                                        ms160, ms200, ms240, ms320,
                                        ms400, ms480, ms520, ms640,
                                        ms720, ms840, ms1280, spare2,
                                        spare1}
                                        OPTIONAL,
                                        -- Cond ServingCellWithoutPUCCH
    crossCarrierSchedulingConfig        CrossCarrierSchedulingConfig
                                        OPTIONAL, -- Need M
    tag-Id                              TAG-Id,
    ue-BeamLockFunction                 ENUMERATED {enabled}
                                        OPTIONAL, -- Need R
    pathlossReferenceLinking            ENUMERATED {pCell, sCell}
                                        OPTIONAL, -- Cond SCellOnly
    servingCellMO                       MeasObjectId
                                        OPTIONAL, -- Cond MeasObject
    ...,
    [[
    lte-CRS-ToMatchAround               SetupRelease { RateMatchPatternLTE-
                                        CRS }
                                        OPTIONAL, -- Need M
```

-continued

| | |
|---|---|
| rateMatchPatternToAddModList | SEQUENCE (SIZE (1..maxNrofRateMatchPatterns)) OF RateMatchPattern OPTIONAL, -- Need N |
| rateMatchPatternToReleaseList | SEQUENCE (SIZE (1..maxNrofRateMatchPatterns)) OF RateMatchPatternId OPTIONAL, -- Need N |
| downlinkchannelBW-PerSCS-List | SEQUENCE (SIZE (1..maxSCSs)) OF SCS-SpecificCarrier OPTIONAL, -- Need S |

```
]]
}
UplinkConfig :: = SEQUENCE {
initialUplinkBWP            BWP-UplinkDedicated
                            OPTIONAL, -- Need M
uplinkBWP-ToReleaseList     SEQUENCE (SIZE (1..maxNrofBWPs))
                            OF BWP-Id
                            OPTIONAL, -- Need N
uplinkBWP-ToAddModList      SEQUENCE (SIZE (1..maxNrofBWPs))
                            OF BWP-Uplink
                            OPTIONAL, -- Need N
firstActiveUplinkBWP-Id     BWP-Id
                            OPTIONAL, -- Cond SyncAndCellAdd
pusch-ServingCellConfig     SetupRelease { PUSCH-
                            ServingCellConfig }
                            OPTIONAL, -- Need M
carrierSwitching            SetupRelease {SRS-CarrierSwitching}
                            OPTIONAL, -- Need M
...,
[[
powerBoostPi2BPSK           BOOLEAN
                            OPTIONAL, -- Need M
uplinkChannelBW-PerSCS-List SEQUENCE (SIZE (1..maxSCSs)) OF
                            SCS-SpecificCarrier
                            OPTIONAL -- Need S
powerBoostPi2BPSK-Slot-Config  Power-Boost-Slot-Config
                            -- OPTIONAL
]]
}
Power-Boost-Slot-Config
{
power-Boost-Slot-Config-Periodicity   ENUMERATED {2, 4, 5, 10, 20, 40, 80,
                                      160}
uplinkSlotBitmapForPowerBoost         BIT STRING (SIZE (power-Boost-Slot-
                                      Config-Periodicity) )
}
---------------------------------------
In detail, the line
powerBoostPi2BPSK-Slot-Config  Power-Boost-Slot-Config
                               -- OPTIONAL
in the " UplinkConfig :: = SEQUENCE { ... } body
as well as the whole "Power-Boost-Slot-Config" section, i.e.
Power-Boost-Slot-Config
{
power-Boost-Slot-Config-Periodicity   ENUMERATED {2, 4, 5, 10, 20, 40, 80,
                                      160}
uplinkSlotBitmapForPowerBoost         BIT STRING (SIZE (power-Boost-Slot-
                                      Config-Periodicity) )
}
``` are added as new parameter to the known RRC message structure, while the remaining parts of the above-cited configuration correspond to the unmodified existing (in existing rel-15 specification) RRC configuration (the known RRC message structure) on serving cell configuration and uplink configuration containing the power-boost information.

Here, "power-Boost-Slot-Config-Periodicity" means a periodicity of the uplink power bosting pattern in slots.

Further, "uplinkSlotBitmapForPowerBoost" indicates, which slots in the period are applicable for uplink transmission (when uplink power boosting is applied).

In order to further allow such control communication as illustrated above, according to exemplary embodiments of the present invention, an existing (in existing rel-15 specification) PUSCH MCS index table is modified by additional MCS indices as shown below.

For existing Table 6.1.4.1-1 and existing Table 6.1.4.1-2 of technical specification TS 38.214, if higher layer parameter tp-pi2BPSK is configured, q=1 otherwise q=2.

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |

-continued

| MCS Index $I_{MCS}$ | Modulation Order $Q_m$ | Target code Rate R × 1024 | Spectral efficiency |
|---|---|---|---|
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28[*] | q | reserved | |
| 29[*] | 2 | reserved | |
| 30[*] | 4 | reserved | |
| 31[*] | 6 | reserved | |
| 28[**] | q | 156/q | 0.1523 |
| 29[**] | q | 198/q | 0.1934 |
| 30[**] | q | 240/q | 0.2344 |
| 31[**] | q | 314/q | 0.3066 |

In detail, the line MCS indices 28 to 31 are modified over the PUSCH MCS index table known from existing rel-15 specification.
Here,
[*]applies if the higher layer parameter powerBoostPi2BPSK-Slot-Config is not configured, or if the higher layer parameter powerBoostPi2BPSK-Slot-Config is configured and the transmission is a retransmission of a transport block, and
[**]applies if the higher layer parameter powerBoostPi2BPSK-Slot-Config is configured and the transmission is first transmission of a transport block.

According to further exemplary embodiments of the present invention, the UE power control behavior is refined in either of TS38.213 and T38.101 or both, at least in the case that MCS-specific power boost is applied.

In particular, according to exemplary embodiments of the present invention, the UE power control behavior may be refined such that the UE power control adds a power boost to the Tx power, or the UE power control adds a power boost to the Tx power cap, or the UE power control transmits with (configured) transmit power that would be higher than the maximum transmit power in other cases.

Consequently, according to at least some of the above-discussed exemplary embodiments of the present invention, a new MCS scheme for FDD system with UE specific uplink-time-slot restriction is implemented to achieve an additional coverage extension.

For example for NR deployments in FDD bands for the regions where rural coverage is an important feature (i.e. India deployments with Low mobility Large cell (LMLC)), enabling MCS scheme with power-boosting without impacting system capacity is essential.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
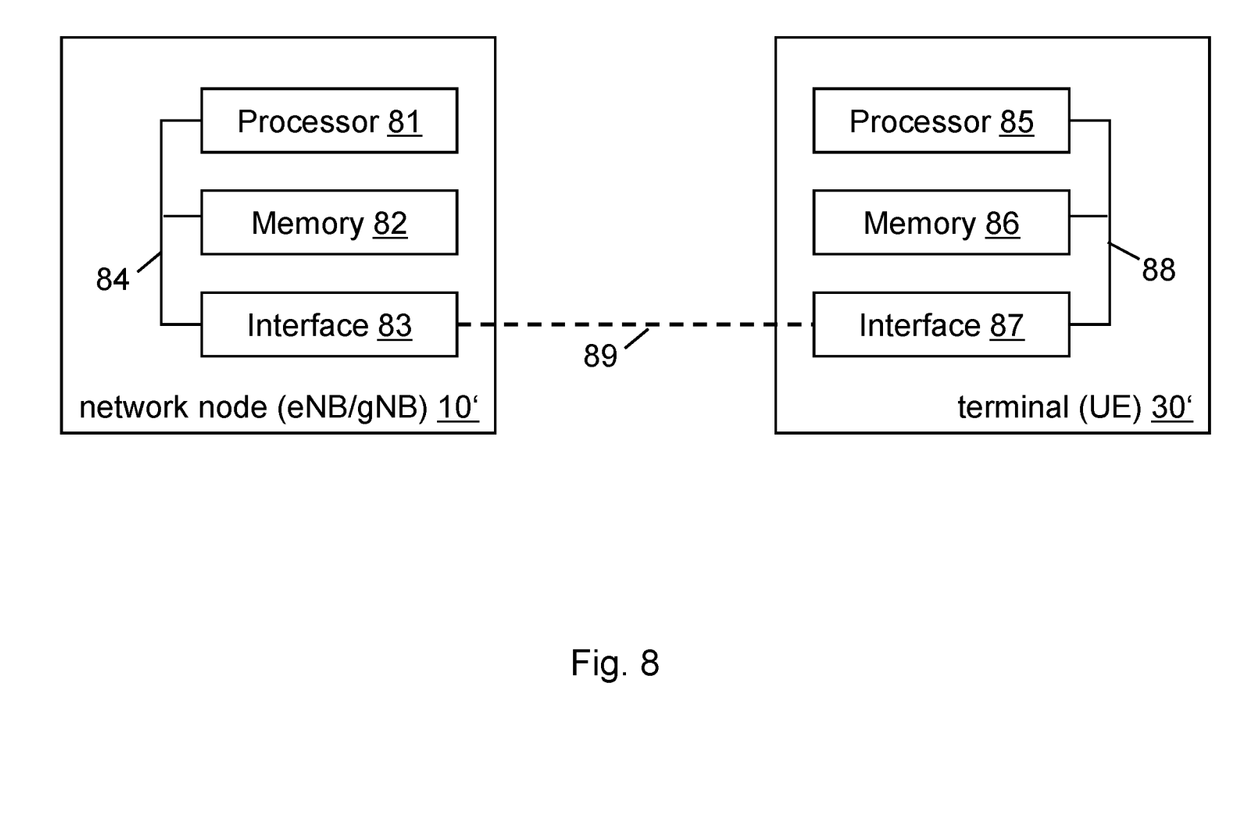
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (network node) 10' (corresponding to the network node 10) comprises a processor 81, a memory 82 and an interface 83, which are connected by a bus 84 or the like. Further, according to exemplary embodiments of the present invention, the apparatus (terminal) 30' (corresponding to the terminal 30) comprises a processor 85, a memory 86 and an interface 87, which are connected by a bus 88 or the like, and the apparatuses may be connected via link 89, respectively.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform transmitting, to a terminal, a configuration indicative of uplink slots to be used by said terminal when a first modulation and coding scheme is activated (thus the apparatus comprising corresponding means for transmitting), and to perform controlling a transmission, to said terminal, of information indicative of that said first modulation and coding scheme is to be activated (thus the apparatus comprising corresponding means for controlling).

According to further exemplary embodiments of the present invention, an apparatus representing the terminal 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform obtaining a configuration indicative of uplink slots to be used when a first modulation and coding scheme is activated (thus the apparatus comprising corresponding means for obtaining), to perform receiving information indicative of that said first modulation and coding scheme is to be activated (thus the apparatus comprising corresponding means for receiving), and to perform activating, upon receiving said information, said first modulation and coding scheme for uplink transmission (thus the apparatus comprising corresponding means for activating).

For further details regarding the operability/functionality of the individual apparatuses, reference is made to the above description in connection with any one of FIGS. 1 to 7, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for time slot control for radio power boosting. Such measures exemplarily comprise transmitting, to a terminal, a configuration indicative of uplink slots to be used by said terminal when a first modulation and coding scheme is activated, and controlling a transmission, to said terminal, of information indicative of that said first modulation and coding scheme is to be activated.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3rd Generation Partnership Project
BPSK binary phase shift keying
BWP bandwidth part
DCI downlink control information
DFT Discrete Fourier Transform
DL downlink
FDD frequency division duplexing
LMLC Low mobility Large cell
MCS modulation and coding scheme
NR New Radio
OFDM orthogonal frequency division multiplexing
PAPR peak-to-average power ratio
PC power class
PUSCH physical uplink shared channel
RCU remote control unit
RRC radio resource control
RRH remote radio head
SAR specific absorption rate
TDD time division duplexing
TDM time division multiplexing
UE user equipment
UL uplink

The invention claimed is:

1. A method comprising:
    transmitting, to a terminal, a configuration indicative of uplink slots to be used by said terminal when a first modulation and coding scheme is activated,
    controlling a transmission, to said terminal, of information indicative of that said first modulation and coding scheme is to be activated; and
    determining whether a first condition related to a radio cell providing uplink resources for said terminal is fulfilled,
    wherein in relation to said controlling, the method further comprises:
    deciding to control said transmission, if said first condition is fulfilled; and
    said first condition includes that an uplink coverage condition of said radio cell is smaller than a predetermined modulation and coding scheme threshold related to a second modulation and coding scheme.

2. The method according to claim 1, wherein:
the configuration comprises a radio resource control signaling or a radio resource control re-configuration signaling.

3. The method according to claim 1, wherein:
said second modulation and coding scheme corresponds to pi/2-binary-phase-shift-keying without power-boosting.

4. The method according to claim 3, wherein:
said power-boosting indicates an increase of transmission power by a predetermined amount.

5. The method according to claim 1, wherein:
said first modulation and coding scheme corresponds to pi/2-binary-phase-shift-keying with power-boosting.

6. The method according to claim 1, wherein:
said information includes downlink control information.

7. The method according to claim 1, wherein:
said configuration indicates said uplink slots as a bitmap over a predetermined number of slots.

8. The method according to claim 7, wherein:
said configuration indicates permitted symbols for each of said uplink slots.

* * * * *